United States Patent
Sahai

(10) Patent No.: US 8,660,142 B2
(45) Date of Patent: Feb. 25, 2014

(54) SCHEDULING VIRTUAL BANDWIDTH REQUESTS

(75) Inventor: Aakash Sahai, Centennial, CO (US)

(73) Assignee: ViaSat, Inc., Carlsbad, CA (US)

( * ) Notice: Subject to any disclaimer, the term of this patent is extended or adjusted under 35 U.S.C. 154(b) by 176 days.

(21) Appl. No.: 12/552,165

(22) Filed: Sep. 1, 2009

(65) Prior Publication Data

US 2010/0074275 A1    Mar. 25, 2010

Related U.S. Application Data

(60) Provisional application No. 61/100,206, filed on Sep. 25, 2008.

(51) Int. Cl.
*H04J 3/16* (2006.01)
*H04L 12/66* (2006.01)

(52) U.S. Cl.
USPC ........... 370/468; 370/322; 370/337; 370/348; 370/352; 709/238; 709/226; 709/240; 709/242

(58) Field of Classification Search
USPC .......... 370/468, 322, 337, 348, 352; 709/238, 709/226, 240, 242, 245, 223, 224; 395/200.68, 200.56, 200, 187
See application file for complete search history.

(56) References Cited

U.S. PATENT DOCUMENTS

| | | | |
|---|---|---|---|
| 4,041,397 A | 8/1977 | Bauer et al. | |
| 4,287,598 A | 9/1981 | Langseth et al. | |
| 4,858,229 A | 8/1989 | Rosen et al. | |
| 4,910,792 A | 3/1990 | Takahata et al. | |
| 5,465,410 A | 11/1995 | Hiben et al. | |
| 5,550,550 A | 8/1996 | Das | |
| 5,673,393 A * | 9/1997 | Marshall et al. | 709/226 |
| 5,839,050 A | 11/1998 | Baehr et al. | |
| 5,987,233 A | 11/1999 | Humphrey | |
| 5,991,306 A | 11/1999 | Burns et al. | |
| 5,991,622 A | 11/1999 | Henry, Jr. | |
| 6,041,359 A * | 3/2000 | Birdwell | 709/238 |
| 6,047,171 A | 4/2000 | Khayrallah et al. | |
| 6,101,549 A * | 8/2000 | Baugher et al. | 709/238 |
| 6,169,513 B1 | 1/2001 | Cohen | |
| 6,434,609 B1 | 8/2002 | Humphrey | |
| 6,442,598 B1 | 8/2002 | Wright et al. | |

(Continued)

FOREIGN PATENT DOCUMENTS

| | | |
|---|---|---|
| EP | 0774848 A2 | 5/1997 |
| EP | 0 837 569 | 4/1998 |

(Continued)

OTHER PUBLICATIONS

U.S. Appl. No. 11/847,006, filed Aug. 29, 2007.

(Continued)

*Primary Examiner* — Andrew Chriss
*Assistant Examiner* — Jamal Javaid
(74) *Attorney, Agent, or Firm* — Holland & Hart LLP

(57) ABSTRACT

Disclosed is a method of scheduling bandwidth, comprising, receiving a first bandwidth request associated with the first communication device. Receiving, from a policy agent, a second bandwidth request associated with a second communication device. The second bandwidth request does not originate from the second communication device. Bandwidth is granted to the first communication device based on the first bandwidth request. Bandwidth is granted to the second communication device based on the second bandwidth request.

20 Claims, 7 Drawing Sheets

(56) References Cited

U.S. PATENT DOCUMENTS

| | | | |
|---|---|---|---|
| 6,546,488 | B2 | 4/2003 | Dillon et al. |
| 6,601,090 | B1 | 7/2003 | Gurijala et al. |
| 6,618,751 | B1 | 9/2003 | Challenger et al. |
| 6,658,463 | B1 | 12/2003 | Dillon et al. |
| 6,678,791 | B1 | 1/2004 | Jacobs et al. |
| 6,763,006 | B1 | 7/2004 | Lockett |
| 6,842,437 | B1 * | 1/2005 | Heath ............... 370/322 |
| 6,947,440 | B2 | 9/2005 | Chatterjee et al. |
| 7,039,683 | B1 | 5/2006 | Tran et al. |
| 7,155,505 | B1 * | 12/2006 | Davidson et al. ........ 709/224 |
| 7,289,062 | B2 | 10/2007 | Hudson et al. |
| 7,359,395 | B2 | 4/2008 | Toporek et al. |
| 7,421,487 | B1 * | 9/2008 | Peterson et al. ........ 709/223 |
| 7,516,236 | B2 | 4/2009 | Walsh et al. |
| 7,761,598 | B1 * | 7/2010 | Beser ............... 709/245 |
| 2001/0052015 | A1 | 12/2001 | Lin et al. |
| 2002/0006116 | A1 | 1/2002 | Burkhart |
| 2002/0044546 | A1 * | 4/2002 | Magill et al. .......... 370/352 |
| 2002/0073167 | A1 | 6/2002 | Powell et al. |
| 2002/0129181 | A1 * | 9/2002 | Lahiri et al. ........... 710/113 |
| 2002/0143984 | A1 | 10/2002 | Hudson |
| 2004/0224633 | A1 | 11/2004 | Coromina et al. |
| 2006/0155893 | A1 * | 7/2006 | Bottemiller et al. ........ 710/27 |
| 2007/0037512 | A1 | 2/2007 | Godwin |
| 2008/0056176 | A1 | 3/2008 | Hudson |
| 2008/0056189 | A1 | 3/2008 | Hudson et al. |
| 2008/0192820 | A1 * | 8/2008 | Brooks et al. ........ 375/240.02 |
| 2008/0212591 | A1 * | 9/2008 | Wu et al. ............ 370/395.21 |

FOREIGN PATENT DOCUMENTS

| | | |
|---|---|---|
| GB | 1 223 163 | 2/1971 |
| WO | EP 0762637 | 3/1997 |
| WO | WO 99/18678 | 4/1999 |
| WO | WO 99/63711 | 12/1999 |
| WO | WO 00/46682 | 8/2000 |
| WO | WO 2004/002016 | 12/2003 |
| WO | WO 2005/067367 | 7/2005 |
| WO | WO 2008/027974 | 3/2008 |

OTHER PUBLICATIONS

U.S. Appl. No. 60/840,809, filed Aug. 29, 2006.
U.S. Appl. No. 61/100,206, filed Sep. 25, 2008.
U.S. Appl. No. 11/847,064, filed Aug. 29, 2007.
U.S. Appl. No. 11/847,102, filed Aug. 29, 2007.
U.S. Appl. No. 11/847,084, filed Aug. 29, 2007.
U.S. Appl. No. 11/847,121, filed Aug. 29, 2007.
International Search Report and Written Opinion of the International Searching Authority; International Application No. PCT US2007/077124; filed Jul. 22, 2008.
Patent Abstracts of Japan; vol. 012, No. 461 (E-689), Dec. 5, 1988, and JP 63 185129 A (NEC Corp), Jul. 30, 1988 (see abstract).
U.S. Appl. No. 61/091,984, filed Aug. 26, 2008.
U.S. Appl. No. 12/544,130, filed Aug. 19, 2009.
U.S. Appl. No. 61/095,979, filed Sep. 11, 2008.
U.S. Appl. No. 12/265,618, filed Nov. 5, 2008.
U.S. Appl. No. 12/544,121, filed Aug. 19, 2009.
Patent Abstracts of Japan; vol. 012, No. 452 (E-687), Nov. 28, 1988, and JP 63 179629 A (Nippon Telegr & Teleph Corp), Jul. 23, 1988 (see abstract).
Data Over Cable Service Interface Specifications (DOCSIS 3.0): Physical Layer Specification, May 22, 2008. Available from www.cablemodem.com. Downloaded on Oct. 9, 2008. Cable Television Laboratories, Inc. Copyright 2006-2008. CM-SP-PHYv3.0-107-080522.
Digital Video Broadcasting (DVB);Second generation framing structure, channel coding and modulation systems for Broadcasting, Interactive Services, News Gathering and other broadband satellite applications, (draft ETSI EN 302 307) version 1.1.1, Jun. 2004. Available from www.etsi.org. Downloaded on Oct. 9, 2008.
"Digital Video Broadcasting (DVB); Second Generation Framing Structure, Channel coding and Modulation Systems for Broadcasting, Interactive Services, News Gathering and other Broadband Satellite Applications", (ETSI EN 302 307) version 1.1.2, Jun. 2006. Available from www.etsi.org. Downloaded on Oct. 9, 2008.
INPI, Written Opinion and Search Report dated Jun. 24, 2013, FR Pat. App. No. 0956649, 6 pgs.

* cited by examiner

SCHEDULING VIRTUAL BANDWIDTH REQUESTS

CROSS REFERENCE TO RELATED APPLICATIONS

The present application is based upon and claims the benefit of U.S. provisional application Ser. No. 61/100,206, filed Sep. 25, 2008, by Aakash Sahai, entitled "Scheduling Virtual Bandwidth Requests." The entire content of this application is hereby specifically incorporated herein by reference for all it discloses and teaches.

BACKGROUND OF THE INVENTION

The rapid growth in the internet, internet content, and networked communications in general has fueled demand for faster communication to homes and businesses. However, installing new Ethernet or fiber optic cable to every home and business served by a communication company appears to be prohibitively expensive. This is the so-called "last mile" problem.

To facilitate the use of existing cable television infrastructure for internet protocol (IP) communication, a series of standards were developed and promulgated. These standards are known by the acronym DOCSIS. DOCSIS stands for Data Over Cable Service Interface Specification. The DOCSIS standards pursue the aim of providing a comprehensive IP solution for cable TV operators. Using the DOCSIS standards, cable TV operators are be able to provide internet access to their subscribers over their existing cable while also providing cable television service. The DOCSIS standards also aim to provide higher data rates than dial-up or digital subscriber loop (DSL) services provided by telephone companies. The DOCSIS standards may include specifications for various aspects of communication via a cable TV system including processes for registering on the network, carrier modulation, frequency bands of operation, and message formats.

SUMMARY OF THE INVENTION

An embodiment of the invention may therefore comprise a method of scheduling bandwidth, comprising: receiving a first bandwidth request associated with said first communication device; receiving, from a policy agent, a second bandwidth request associated with a second communication device, the second bandwidth request not originating from said second communication device; granting bandwidth to said first communication device based on said first bandwidth request; and, granting bandwidth to said second communication device based on said second bandwidth request.

An embodiment of the invention may therefore further comprise: a system for granting bandwidth requests to a shared medium, comprising: a first request processor that receives indicators of bandwidth requests from a plurality of communication devices communicating via said shared medium; a second request processor that receives indicators of virtual bandwidth requests from a policy agent; and, a scheduler that allocates a communication resource on said shared medium based on said indicators of bandwidth requests and said indicators of virtual bandwidth requests.

DETAILED DESCRIPTION OF THE EMBODIMENTS

Figure 1:
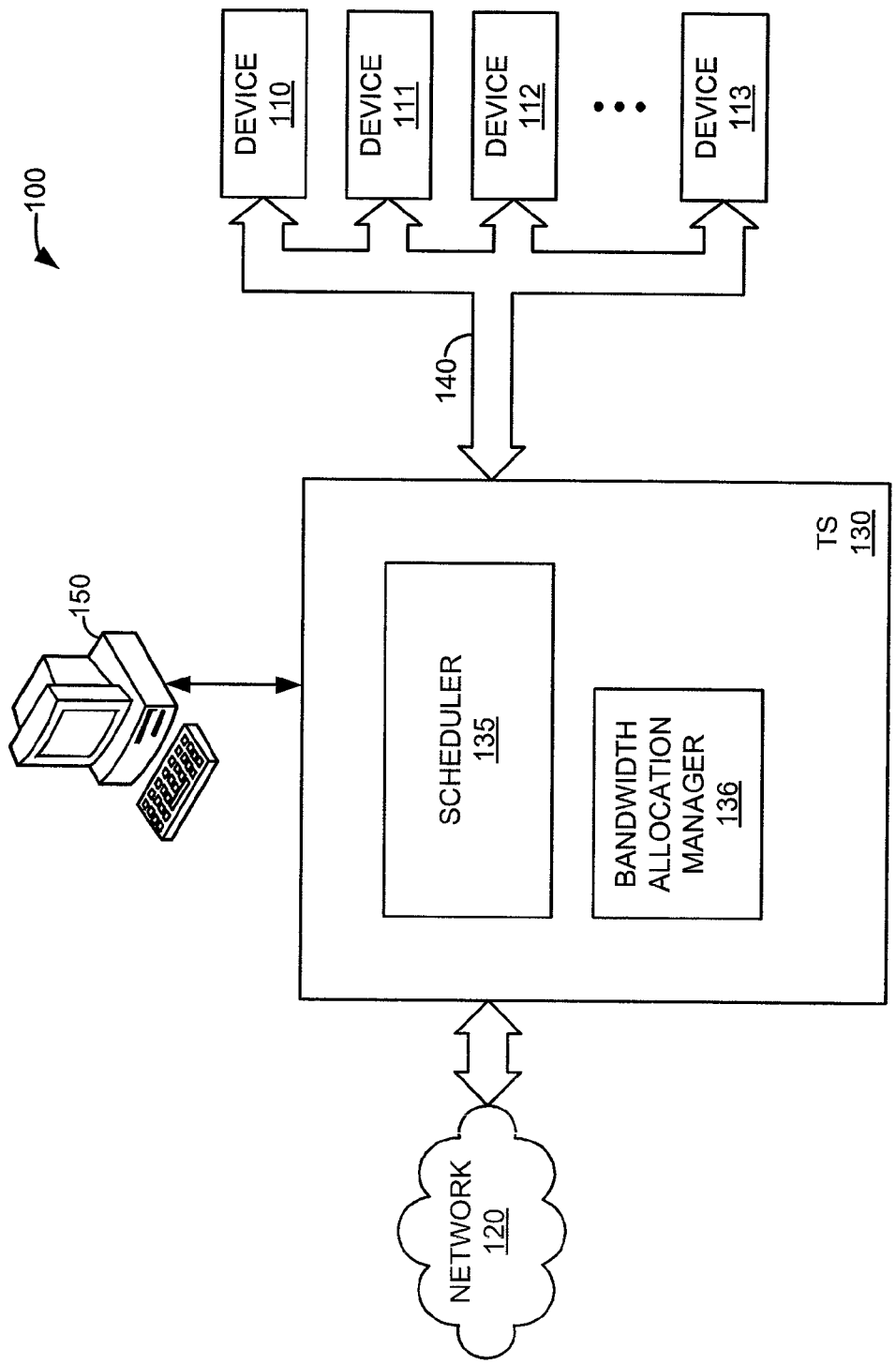
FIG. 1 is a block diagram illustrating a communication system.

FIG. 1 is a block diagram illustrating a communication system. Communication system 100 comprises devices 110-113, network 120, termination system 130, shared medium 140, and policy agent 150. Termination system 130 includes scheduler 135 and bandwidth allocation manager 136. Network 120 is operatively coupled to termination system 130. Policy agent 150 is operatively coupled to termination system 130. Devices 110-113 are operatively coupled to termination system 130 via shared medium 140. Thus, devices 110-113 may be operatively coupled to network 120 via shared medium 140 and termination system 130.

Network 120 could be any network or collection of networks that couple, link, or otherwise operatively termination system 130 with other computer systems, networks, or policy agent 150. In addition, other secondary data networks could be used. In an example, communication network 120 may include a backhaul network, a local network, a long distance network, a packet network, the internet, a hybrid fiber-coax network, or any combination thereof, as well as other types of networks.

Devices 110-113 may be any device, system, or other such communication platform capable of communicating with termination system 130 via shared medium 140. Devices 110-113 may be, for example, a cable modem, a satellite modem, a mobile phone, a wireless phone, a wireless modem, a wireless USB modem, a personal digital assistant (PDA), as well as other types of devices or systems that can communicate with termination system 130 via shared medium 140.

The operative coupling of devices 110-113 and network 120 may be described by a reference model for communications and network protocol design. This description may be referred to as the TCP/IP or Internet reference model and include six layers. These layers, which are all operatively coupled, may be referred to as the physical layer (PHY), the data link layer, the medium access control (MAC) layer, the network/internet layer, the transport layer, and the application layer. Shared medium 140 may be the physical layer that operatively couples devices 110-113 with termination system 140. In an example, shared medium 140 may be a wireless link that is relayed via a satellite. Shared medium 140 may be shared among devices 110-113 and termination system 130 using time division multiple access (TDMA) techniques.

Termination system 130 may be device, system, or other such communication platform capable of passing communications to and from network 120 to and from devices 110-113 via shared medium 140. Termination system 130 may be, for example, a cable modem termination system, a satellite modem termination system, or a base station, as well as other types of devices or systems that can pass communication between devices 110-113 and network 120 via shared medium 140.

To allow shared medium 140 to be shared among devices 110-113, termination system 130 includes scheduler 135 and bandwidth allocation manager 136. Scheduler 135 may receive bandwidth requests from devices 110-113. Scheduler 135 may also receive instructions from bandwidth allocation manager 136 to grant bandwidth to devices 110-113. A bandwidth request may represent a desire by a particular device 110-113, or an instruction from bandwidth allocation manager 136, for an allocation of bandwidth on shared medium 140. Scheduler 135 may collect these bandwidth requests and then determine whether, and in what order, these requests will be granted. After this determination, termination system 130 may communicate what requests have been granted to devices 110-113. Termination system 130 may also communicate what communication resources each device 110-113 may utilize. In an example, termination system 130 may communicate which TDMA time slots (or mini-slots) each device 110-113 may utilize to send upstream (i.e., from device 110-113 to termination system 140) data. Termination system 130 may communicate these bandwidth allocations to devices 110-113 using a MAP message.

In an embodiment, scheduler 135 may also receive virtual bandwidth requests from policy agent 150. A virtual bandwidth request is a message that communicates to termination system 130 (and thus, scheduler 135) that a certain device 110-113 should be allocated bandwidth. A virtual bandwidth request is not initiated by a device 110-113. Instead, a virtual bandwidth request is generated by policy agent 150 based on certain criteria. For example, policy agent 150 may inspect packets (or the rate of packets) flowing to and/or from a particular device 110 and decide to proactively allocate that device 110 bandwidth by generating a virtual bandwidth request. That virtual bandwidth request, when scheduled by scheduler 135, will result in device 110 being allocated bandwidth that it did not request. Thus, if policy agent 150 accurately anticipates which devices 110-113 are needing bandwidth, the time that devices 110-113 need to wait to be allocated bandwidth is reduced.

Scheduler 135 may schedule virtual bandwidth requests and bandwidth requests. In an embodiment, scheduler 135 may schedule virtual bandwidth requests by treating them as regular bandwidth requests. In an embodiment, scheduler 135 may schedule virtual bandwidth requests and regular bandwidth requests separately. In an embodiment, scheduler 135 may schedule virtual bandwidth requests and regular bandwidth by giving disparate treatment to either virtual bandwidth requests or regular bandwidth requests. For example, scheduler 135 may give virtual bandwidth requests a higher or lower priority than regular bandwidth requests.

In another example, a virtual bandwidth request for a device 110 may be cancelled if there is a regular bandwidth request associated with that same device 110 pending in scheduler 135. In another example, a virtual bandwidth request for a device 110 may be partially granted based on a regular bandwidth request associated with that same device 110 pending in scheduler 135. A virtual bandwidth request may also be partially granted if it requests an amount of bandwidth that will require multiple grants to satisfy.

Virtual bandwidth requests from policy agent 150 may include a control field, a device identifier, a time to live, and a grant size. The control field may be used to tell termination system how to interpret the other fields in the virtual bandwidth request. For example, a bit in the control field may indicate whether scheduler 135 must schedule the requested bandwidth within the time to live period as an aggregate amount. This aggregate amount may include any bandwidth granted in response to a regular bandwidth request or other type of bandwidth grant. In another example, this bit in the control field may indicate that scheduler 135 should schedule the requested bandwidth in addition to any bandwidth granted in response to a regular bandwidth request or other type of bandwidth grant. Other bits in the control field may indicate the type of device identifier that is given in the device identifier field.

A device identifier may be one or more, but is not limited to, a mobile phone number, a mobile directory number (MDN), mobile identification number (MIN), electronic serial number (ESN), medium access control address (MAC address), or internet protocol address (IP address). Other types of device identifiers are also possible. These device identifiers may be associated with devices 110-113, or a device coupled to device 110-113 (not shown), such as a computer that is using a device 110-113 as a router or bridge.

The time to live field may correspond to the time within which scheduler 135 should grant all the bandwidth requested by the virtual bandwidth request. Upon expiration of the time to live, any portion (or all) of the bandwidth requested but not yet granted should be discarded. A value of zero in the time to live field may correspond to an infinite time to live value. The grant size field may correspond to the amount of bandwidth (e.g., number of bytes or octets), including overhead that the virtual bandwidth request is requesting. The overhead may not include overhead from the MAC and PHY layers.

Figure 2:
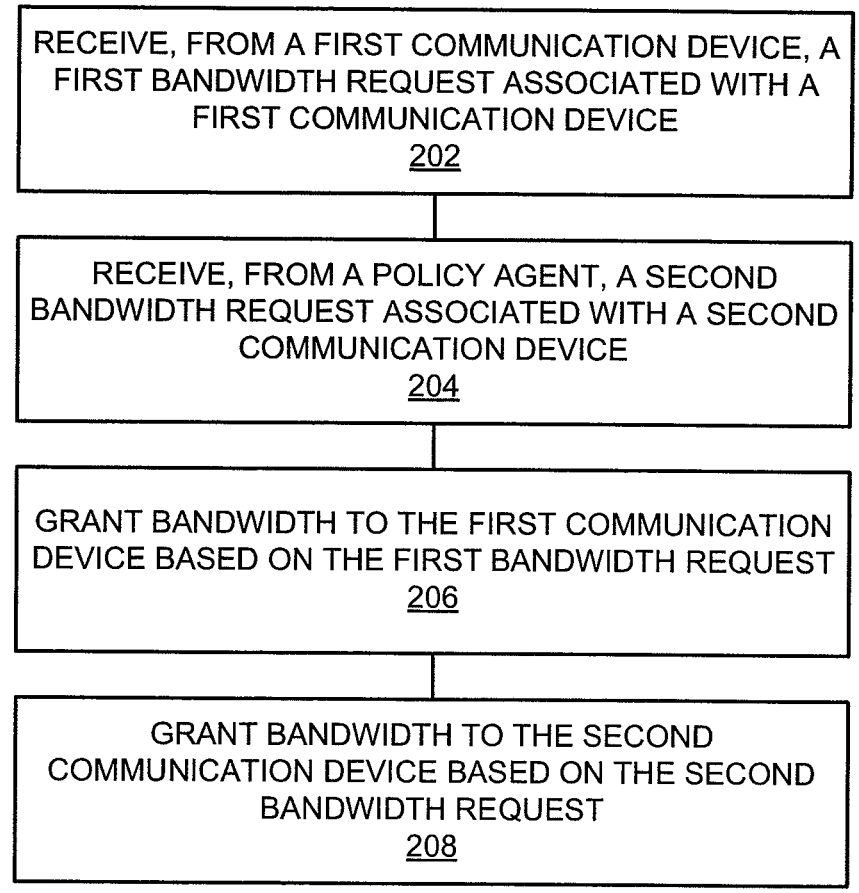
FIG. 2 is a flowchart illustrating a method of scheduling bandwidth.

FIG. 2 is a flowchart illustrating a method of scheduling bandwidth. The steps illustrated in FIG. 2 may be performed by one or more elements of communication system 100.

From a first communication device, a first bandwidth request is received that is associated with the first communication device (202). For example, a bandwidth request from device 110 may be received via shared medium 140 by termination system 130. In another example, a bandwidth request from bandwidth allocation manager 136 may be received. From a first policy agent, a second bandwidth request is received that is associated with a second communication device (204). For example, a virtual bandwidth request from policy agent 150 may be received by termination system 130 that request bandwidth for device 111.

Bandwidth is granted to the first communication device based on the first bandwidth request (206). For example, based on the first bandwidth request, bandwidth may be granted by scheduler 135 to device 110. Bandwidth is granted to the second communication device based on the second bandwidth request (208). For example, based on the virtual bandwidth request from policy agent 150, bandwidth may be granted by scheduler 135 to device 111.

Figure 3:
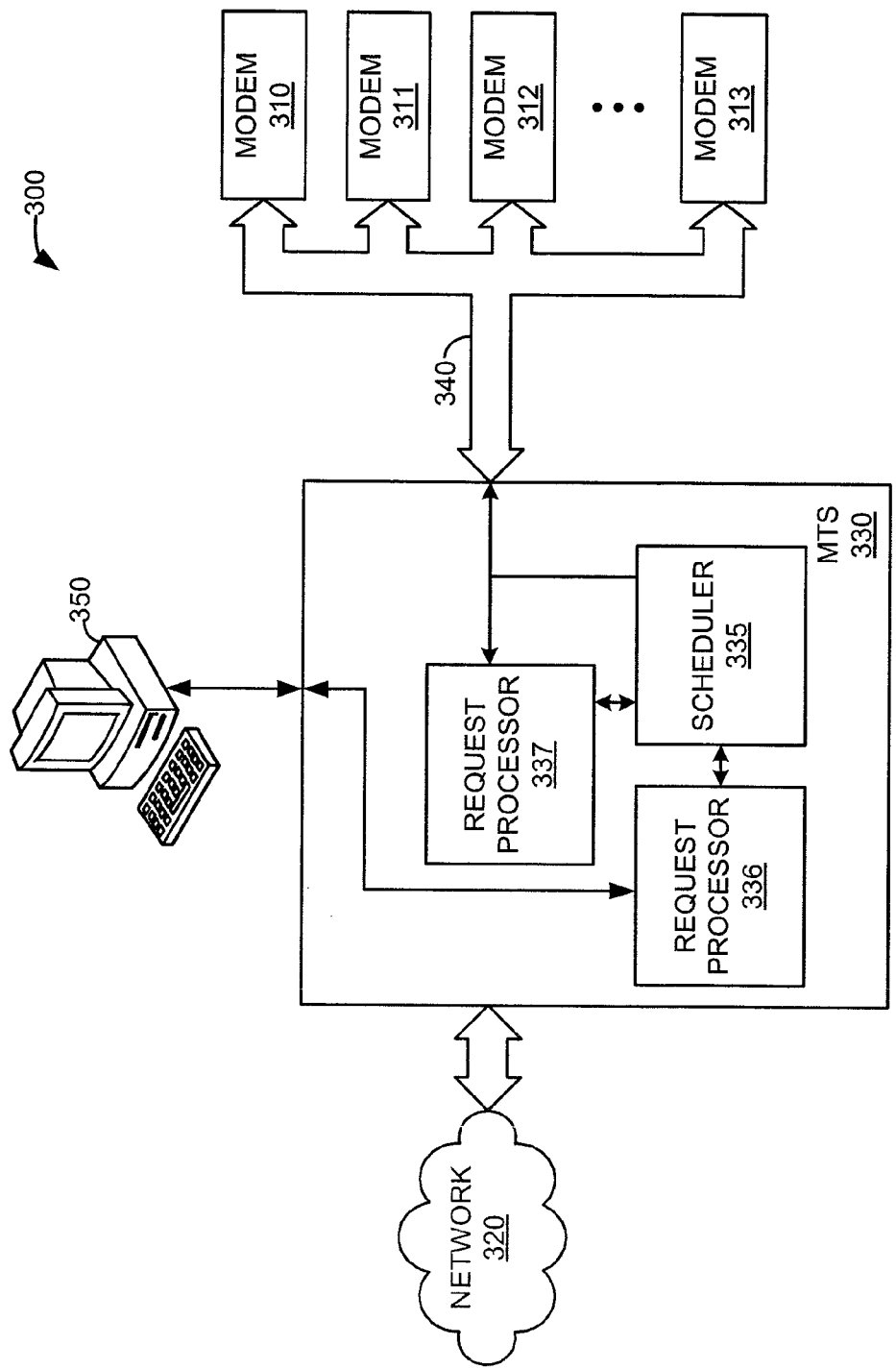
FIG. 3 is a block diagram illustrating a communication system.

FIG. 3 is a block diagram illustrating a communication system. Communication system 300 may perform the steps illustrated in FIG. 2. Communication system 300 may perform the functions discussed in association with communication system 100. Likewise, communication system 100 may perform the functions discussed in association with communication system 300. Communication system 300 comprises modems 310-313, network 320, modem termination system 330, shared medium 340, and policy agent 350. Modem termination system 330 includes scheduler 335, request processor 336, and request processor 337. Network 320 is operatively coupled to modem termination system 330. Policy agent 350 is operatively coupled to modem termination system 330. Modems 310-313 are operatively coupled to modem termination system 330 via shared medium 340. Thus, modems 310-313 may be operatively coupled to network 320 via shared medium 340 and modem termination system 330.

Network 320 could be any network or collection of networks that couple, link, or otherwise operatively modem termination system 330 with other computer systems, networks, or policy agent 350. In addition, other secondary data networks could be used. In an example, communication network 320 may include a backhaul network, a local network, a long distance network, a packet network, the internet, a hybrid fiber-coax network, or any combination thereof, as well as other types of networks.

Modems 310-313 may be any device, system, or other such communication platform capable of communicating with modem termination system 330 via shared medium 340. Modems 310-313 may be, for example, a cable modem, a satellite modem, a wireless modem, a wireless USB modem, as well as other types of devices or systems that can communicate with modem termination system 330 via shared medium 340.

The operative coupling of modems 310-313 and network 320 may be described by the TCP/IP or Internet reference model. Shared medium 340 may be the physical layer that operatively couples modems 310-313 with modem termination system 340. In an example shared medium 340 may be a wireless link that is relayed via a satellite. Thus, modems 310-313 would be satellite modems. Shared medium 340 may be shared among modems 310-313 and modem termination system 330 using TDMA techniques.

Modem termination system 330 may be device, system, or other such communication platform capable of passing communications to and from network 320 to and from modems 310-313 via shared medium 340. Modem termination system 330 may be, for example, a cable modem termination system, a satellite modem termination system, or a base station, as well as other types of devices or systems that can pass communication between modems 310-313 and network 320 via shared medium 340.

To allow shared medium 340 to be shared among modems 310-313, modem termination system 330 includes scheduler 335. Scheduler 335 may receive bandwidth requests from request processor 336 and request processor 337. Request processor 336 receives virtual bandwidth requests from policy agent 350. Request processor 337 receives bandwidth requests from modems 310-313. Request processor 337 may also generate bandwidth requests.

Request processor 336 and request processor 337 pass bandwidth requests to scheduler 335. These bandwidth requests represent requests that an allocation of bandwidth on shared medium 340 be given to a modem 310-313. Scheduler 335 may collect these bandwidth requests and then determine whether, and in what order, these requests will be granted. After this determination, modem termination system 330 may communicate, to modems 310-313, that allocations of bandwidth have been granted to modems 310-313. Modem termination system 330 may also communicate what communication resources each modem 310-313 may utilize. In an example, modem termination system 330 may communicate which TDMA mini-slots each modem 310-313 may utilize to send upstream data. Modem termination system 330 may communicate these bandwidth allocations to modems 310-313 using a MAP message.

In an embodiment, request processor 336 receives virtual bandwidth requests from policy agent 350. These virtual bandwidth request may be received by modem termination system 330 from policy agent 350 on a predefined uniform datagram protocol (UDP) port. Request processor 336 may bind itself to this predefined port. This port may be part of a management interface of modem termination system 330.

A virtual bandwidth request may comprise several fields. In an embodiment, a virtual bandwidth request may be comprised of, in order: (1) 4 control bits; (2) 12 time to live bits; (3) 16 grant size bits; and, either a 32 or 48 bit end point identifier (EPID). The EPID is 32 bits long if the EPID is an IP address. The EPID is 48 bits long if the EPID is a MAC address. The EPID may be: (1) an IP address associated with a device coupled to a modem 310-313; (2) the IP address of a modem 310-313; or, (3) the MAC address of a modem 310-313. The EPID may be other forms of a device identifier discussed previously.

The control bits may carry information that is used to interpret the other fields of the virtual bandwidth request. The control bits may be arranged as an eight bit wide field where bit 0 is the least significant bit. Bit 0 may be the ALLOC_AGR bit. When the ALLOC_AGR bit is set, scheduler 335 should use the grant size specified in the virtual bandwidth request as an aggregate amount of bandwidth to be allocated within the time to live period. This aggregate amount counts any bandwidth allocated to the end point (e.g., modem 310) in response to a real bandwidth request made by the end point or on a command from a bandwidth allocation manager. When the ALLOC_AGR bit is not set, the scheduler should treat the allocation request as an incremental request that should be granted in addition to bandwidth granted to the end point within the time to live period.

The time to live field may be specified in milliseconds. The time to live may correspond to the time within which the entire grant of the virtual bandwidth request should be made by scheduler 335 or any remaining part of the virtual bandwidth request is discarded. A zero value for the time to live field indicates that the time to live is infinite and the request should never be discarded. The time to live value may be interpreted by scheduler 335 as a relative time from insertion of a virtual bandwidth request into a queue.

The grant size field may be the request size of a data grant specified in octets. The grant size field may include higher layer overheads but may not include any MAC and PHY layer overheads. Scheduler 335 should allocate the grant size amount in one chunk unless the grant size exceeds a maximum burst size constraint. In general, it should be a goal of scheduler 335 to minimize the number of fragments when allocating (a.k.a., granting) virtual bandwidth requests.

In an embodiment, request processor 336 may determine an upstream scheduler 335 instance that is serving requests from the EPID associated with the device specified in a virtual bandwidth request. Request processor 336 may determine an upstream channel identification (CID) that to corresponds to the upstream channel in use by the device specified in a virtual bandwidth request. Request processor 336 may determine a primary service identification (SID) associated with the EPID specified in the virtual bandwidth request. This information may be used by request processor 336 to select an appropriate scheduler 335 or queue to as the destination for the virtual bandwidth request. If the EPID is not known to modem termination system 330, request processor 336 may discard the virtual bandwidth request.

In an embodiment, scheduler 335 may receive virtual bandwidth requests from request processor 336. A virtual bandwidth request is not initiated by a modem 310-313 or request processor 337. Instead, a virtual bandwidth request is generated by policy agent 350 based on certain criteria. For example, policy agent 350 may inspect packets (or the rate of packets) flowing to and/or from a particular modem 310 and decide to proactively allocate that modem 310 bandwidth by generating a virtual bandwidth request. That virtual bandwidth request, when scheduled by scheduler 335, will result in modem 310 being allocated bandwidth that it did not request. Thus, if policy agent 350 accurately anticipates which modems 310-313 are needing bandwidth, the time that modems 310-313 need to wait to be allocated bandwidth is reduced.

Scheduler 335 may schedule virtual bandwidth requests and bandwidth requests. In an embodiment, scheduler 335 may schedule virtual bandwidth requests by treating them as regular bandwidth requests. In an embodiment, scheduler 335 may schedule virtual bandwidth requests and regular bandwidth requests separately. In an embodiment, scheduler 335 may schedule virtual bandwidth requests and regular bandwidth by giving disparate treatment to either virtual bandwidth requests or regular bandwidth requests. For example, scheduler 335 may give virtual bandwidth requests a higher or lower priority than regular bandwidth requests.

In another example, a virtual bandwidth request for a modem 310 may be cancelled if there is a regular bandwidth request from that same modem 310 pending in scheduler 335. In another example, a virtual bandwidth request for a modem 310 may be partially granted based on the existence of a regular bandwidth request associated with that same modem 310 pending in scheduler 335. A virtual bandwidth request may also be partially granted if it requests an amount of bandwidth that will require multiple grants to satisfy.

Figure 4:
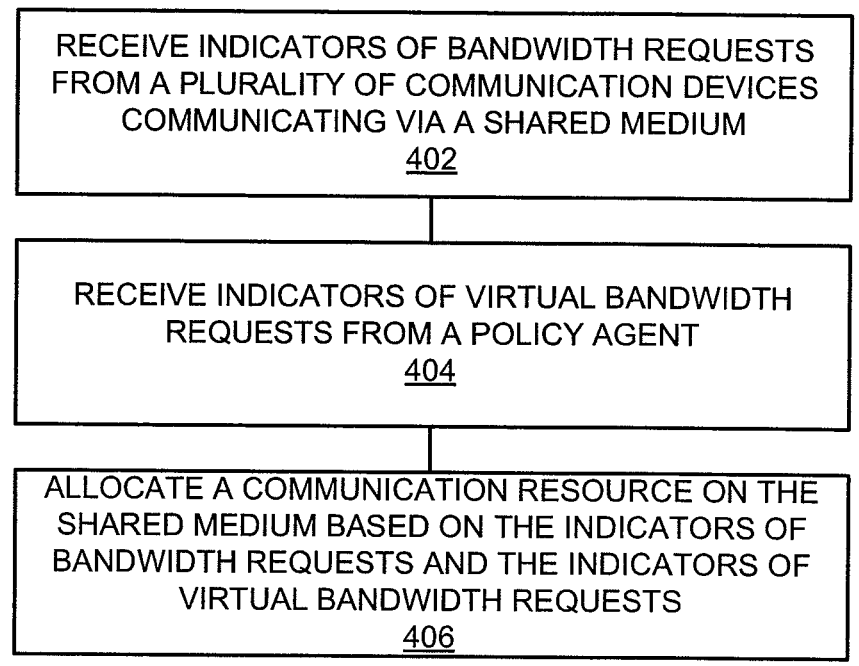
FIG. 4 is a flowchart illustrating a method of allocating bandwidth.

FIG. 4 is a flowchart illustrating a method of allocating bandwidth. The steps illustrated in FIG. 4 may be performed by one or more elements of communication system 100 or communication system 300.

Indicators of bandwidth requests are received from a plurality of communication devices communicating via a shared medium (402). For example, modem termination system 330 or request processor 337 may receive bandwidth requests from modems 310-313 via shared medium 340. In another example, modem termination system 330 may receive bandwidth requests from request processor 337. In an example, bandwidth requests from modems 310-313 may be received in a manner specified by the DOCSIS standard. Manners of receiving bandwidth requests may include requests sent in a contention region, piggybacked requests, or signaled through some other manner.

Indicators of virtual bandwidth requests are received from a policy agent (404). For example, modem termination system 330 or request processor 336 may receive virtual bandwidth requests from policy agent 350. The virtual bandwidth requests may have the fields described previously.

A communication resource on the shared medium is allocated based on the indicators of bandwidth requests and indicators of virtual bandwidth requests (406). For example, modem termination system 330 or scheduler 335 may allocate upstream bandwidth to modems 310-313 on shared medium 340 based on real bandwidth requests received from modems 310-313 and virtual bandwidth requests received from policy agent 350. In another example, modem termination system 330 or scheduler 335 may allocate upstream bandwidth to modems 310-313 on shared medium 340 based on bandwidth requests received from request processor 337. The allocation of upstream bandwidth may be communicated to modems 310-313 using a MAP message. The allocation of upstream bandwidth may comprise allocations of mini-slots in a TDMA access scheme.

Figure 5:
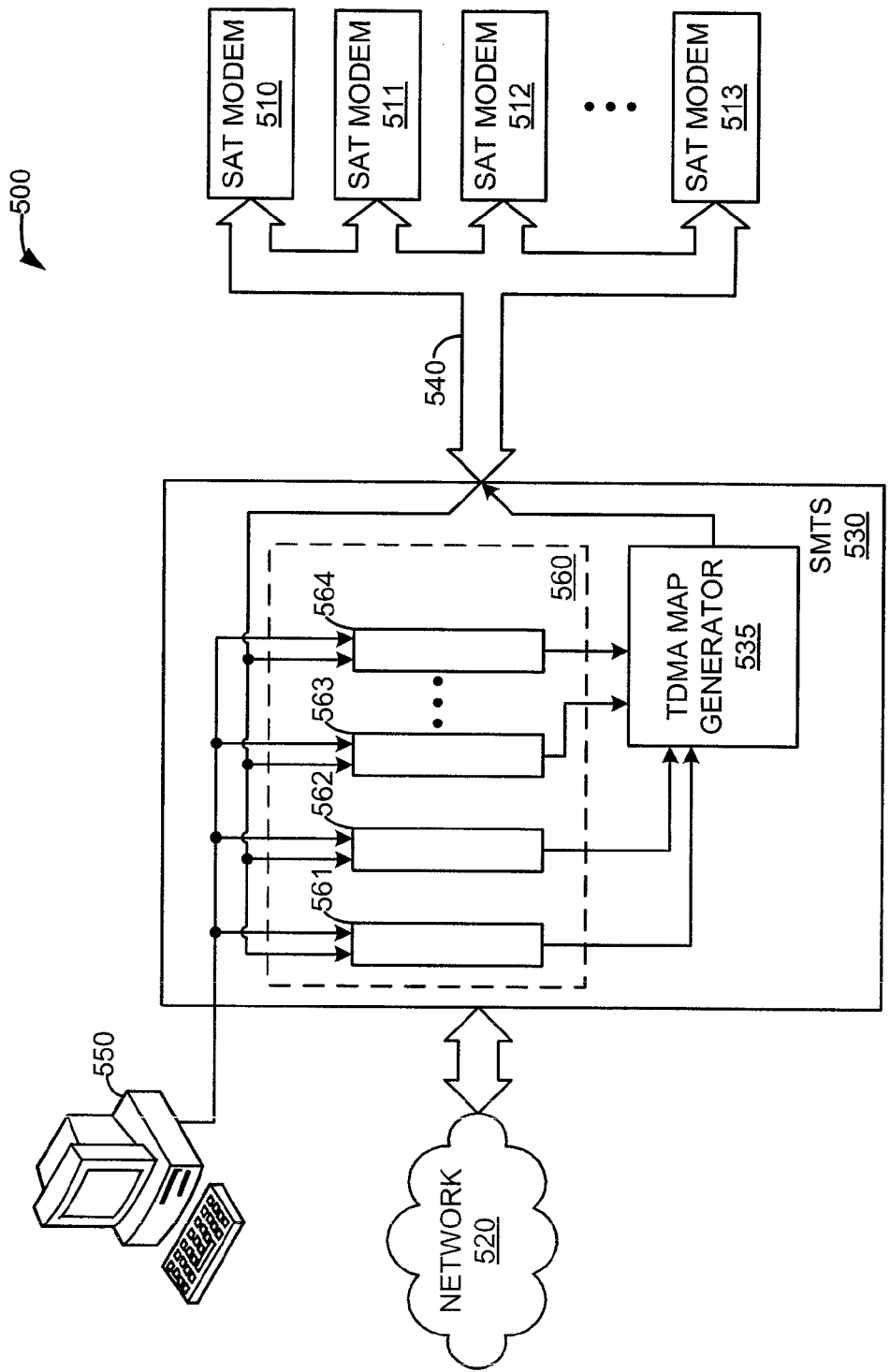
FIG. 5 is a block diagram illustrating a communication system.

FIG. 5 is a block diagram illustrating a communication system. Communication system 500 may perform the steps illustrated in FIG. 2 and FIG. 4. Communication system 500 may perform the functions discussed is association with communication system 100 and communication system 300. Likewise, communication system 100 or communication system 300 may perform the functions discussed in association with communication system 500. Communication system 500 comprises satellite modems 510-513, network 520, satellite modem termination system 530, satellite link 540, and policy agent 550. Satellite modem termination system 530 includes TDMA map generator 535 and scheduler 560. Scheduler 560 includes queue 561, queue 562, queue 563, and queue 564. Queues 561-564 may correspond to DOCSIS specified quality of service (QoS) classifications. In other words, queue 561 may contain bandwidth requests that correspond to SIDs that are associated with unsolicited grant service (UGS). Queue 562 may contain bandwidth requests that correspond to SIDs that are associated with best efforts (BE) service, and so on.

Network 520 is operatively coupled to satellite modem termination system 530. Policy agent 550 is operatively coupled to satellite modem termination system 530. Satellite modems 510-513 are operatively coupled to satellite modem termination system 530 via satellite link 540. Thus, satellite modems 510-513 may be operatively coupled to network 520 via satellite link 540 and satellite modem termination system 530.

Network 520 could be any network or collection of networks that couple, link, or otherwise operatively satellite modem termination system 530 with other computer systems, networks, or policy agent 550. In addition, other secondary data networks could be used. In an example, communication network 520 may include a backhaul network, a local network, a long distance network, a packet network, the internet, a hybrid fiber-coax network, or any combination thereof, as well as other types of networks.

Satellite modems 510-513 may be any device, system, or other such communication platform capable of communicating with satellite modem termination system 530 via satellite link 540. Satellite modems 510-513 may include or be coupled to, for example, an antenna or dish with a low noise block that allows communication via satellite link 540.

The operative coupling of satellite modems 510-513 and network 520 may be described by the TCP/IP or Internet reference model. Satellite link 540 may be the physical layer that operatively couples satellite modems 510-513 with satellite modem termination system 540. Satellite link 540 may be shared among satellite modems 510-513 and satellite modem termination system 530 using TDMA techniques.

Satellite modem termination system 530 may be device, system, or other such communication platform capable of passing communications to and from network 520 to and from satellite modems 510-513 via satellite link 540. Satellite modem termination system 530 may be any type of device or system that can pass communication between satellite modems 510-513 and network 520 via satellite link 540.

To allow satellite link 540 to be shared among satellite modems 510-513, satellite modem termination system 530 includes TDMA map generator 535. TDMA map generator 535 or scheduler 560 may select bandwidth requests from queues 560. TDMA map generator 535 may allocate bandwidth on satellite link 540 based on the bandwidth requests selected from queues 560. TDMA map generator 535 or scheduler 560 may select a queue 561-564 to provide a bandwidth request based on a traffic shaping scheme. For example, TDMA map generator 535 or scheduler 560 may select a queue 561-564 based on a leaky bucket scheme. In another example, TDMA map generator 535 or scheduler 560 may select a queue 561-564 based on a weighted round-robin scheme. Other selection schemes are possible such as the "token-bucket" algorithm or a deficit weighted round robin algorithm. The selection algorithm may also include an algorithm that determines how to handle queue overflows. Examples of algorithms designed to handle queue overflows (a.k.a. buffer tail drops) include random early detection (RED), weighted RED (WRED), and RED In/Out (RIO). After a queue 561-564 is selected, the selected queue may provide a bandwidth request to TDMA map generator 535.

These bandwidth requests represent requests that an allocation of bandwidth on satellite link 540 be given to a satellite modem 510-513. Satellite modem termination system 530 may communicate, to satellite modems 510-513, that allocations of bandwidth have been granted to devices 510-513. Satellite modem termination system 530 may also communicate what communication resources each modem 510-513 may utilize. In an example, satellite modem termination system 530 may communicate which TDMA mini-slots each satellite modem 510-513 may utilize to send upstream data. Satellite modem termination system 530 may communicate these bandwidth allocations to satellite modems 510-513 using a MAP message generated by TDMA map generator 535.

In an embodiment, queues 561-564 may receive virtual bandwidth requests from policy agent 550. Example formats of these virtual bandwidth requests have been discussed previously. In an embodiment, it may be determined which scheduler 560 is serving requests from the EPID associated with the device specified in a virtual bandwidth request. It may also be determined what upstream channel identification (CID) corresponds to the upstream channel in use by the device specified in a virtual bandwidth request. A primary service identification (SID) associated with the EPID specified in the virtual bandwidth request may also be determined. This information may be used to select an appropriate queue 561-564 as the destination for the virtual bandwidth request. If the EPID is not known to satellite modem termination system 530, the virtual bandwidth request may be discarded.

In an embodiment, queues 561-564 may also receive bandwidth requests from satellite modems 510-513. In an embodiment, queues 561-564 may also receive bandwidth requests from another part of satellite modem termination system 530 (not shown), such as a bandwidth allocation manager. Scheduler 560 may schedule virtual bandwidth requests and bandwidth requests contained in queues 561-564. In an embodiment, scheduler 560 may schedule virtual bandwidth requests by treating them as regular bandwidth requests. In an embodiment, scheduler 560 may schedule virtual bandwidth requests and regular bandwidth requests from separate queues 561-564. In an embodiment, scheduler 560 may schedule virtual bandwidth requests and regular bandwidth by giving disparate treatment to either virtual bandwidth requests or regular bandwidth requests. For example, scheduler 560 may give a queue holding virtual bandwidth requests a higher or lower priority than a queue holding real bandwidth requests.

In another example, a virtual bandwidth request for a satellite modem 510 may be cancelled if there is a regular bandwidth request from that same satellite modem 510 pending in a queue 561-564. In another example, a virtual bandwidth request for a satellite modem 510 may be partially granted based on a regular bandwidth request associated with that same satellite modem 510 pending in queue 561-564. A virtual bandwidth request may also be partially granted if it requests an amount of bandwidth that will require multiple grants to satisfy.

Figure 6:
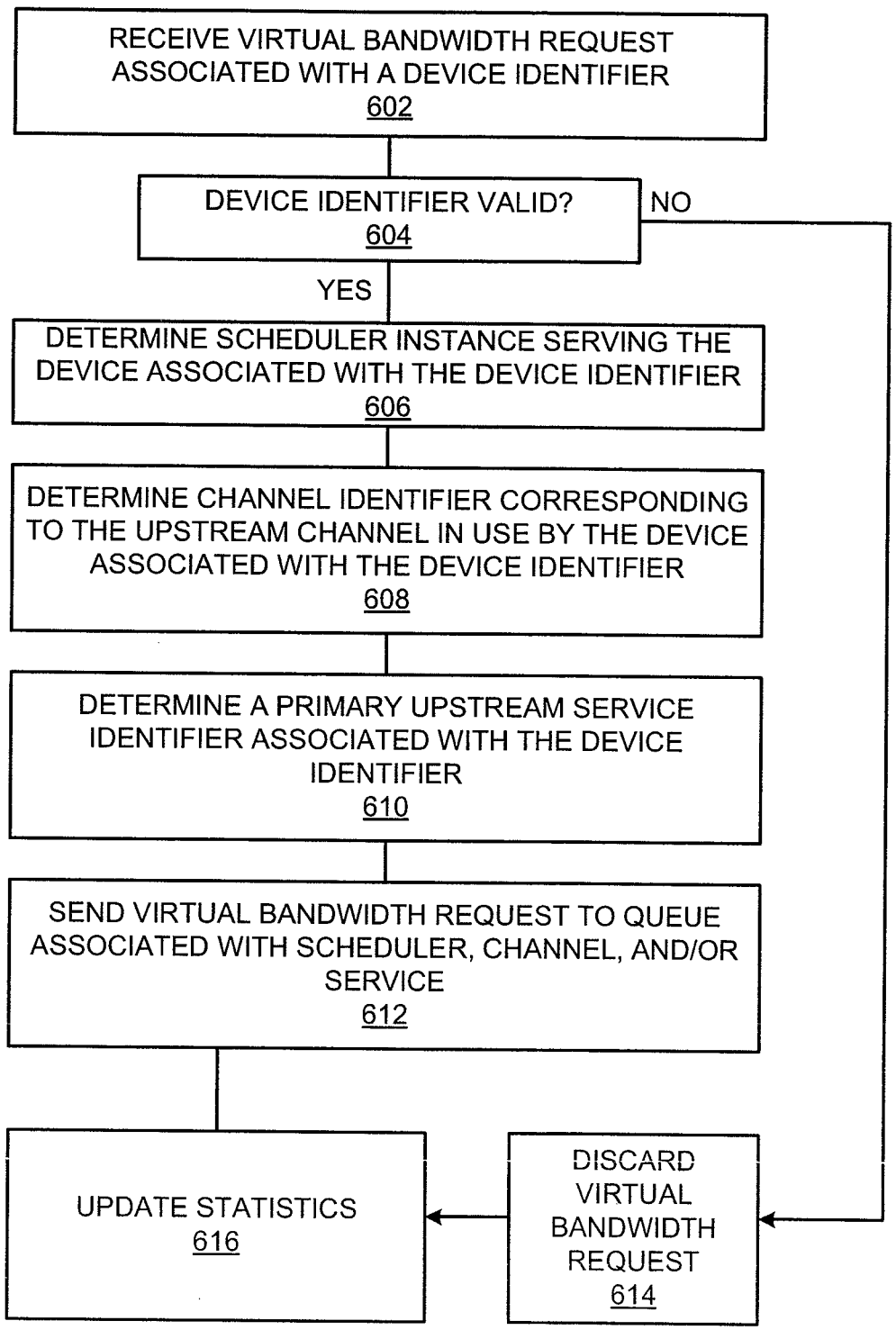
FIG. 6 is a flowchart illustrating a method of scheduling bandwidth.

FIG. 6 is a flowchart illustrating a method of scheduling bandwidth. The steps illustrated in FIG. 6 may be performed by one or more elements of communication system 100, communication system 300, or communication system 500.

A virtual bandwidth request associated with a device identifier is received (602). For example, satellite modem termination system 530 may receive, from policy agent 550, a virtual bandwidth request associated with satellite modem 510. In block 604, the device identifier is checked for validity. If the device identifier is not valid, flow proceeds to block 614. In block 614 the virtual bandwidth request is discarded and flow then proceed to block 616. If the device identifier is valid, flow proceeds to block 606.

The scheduler instance serving the device associated with the device identifier is determined (606). For example, it may be determined that scheduler 560 is serving satellite modem 510. The device identifier received in the virtual bandwidth request may be associated with satellite modem 510.

A channel identifier corresponding to the upstream channel in use by the device associated with the device identifier is determined (608). For example, a channel identifier corresponding to the upstream channel in use by satellite modem 510 may be determined. A primary service identifier associated with the device identifier is determined (610). For example, a service identifier corresponding to satellite modem 510 may be determined.

The virtual bandwidth request is sent to a queue associated with the determined scheduler, channel, and/or service (612). For example, a virtual bandwidth request may be sent to queue 561 based on the scheduler 560, channel identification, and service identification associated with satellite modem 510.

Statistics are updated (616). For example, satellite modem termination system 530 may include an interface for an external agent to monitor the operation of virtual bandwidth requests. Satellite modem termination system 530 may gather information that will aid policy agent 550 to make adequate and appropriate decisions regarding the creation and scheduling of virtual bandwidth requests. The interface may be provided in the form of a simple network management protocol (SNMP) management information base (MIB). The interface may be provided in the form of a command line interface.

Satellite modem termination system (SMTS) 530 may track the total mini slots mapped. This may be a running total of the mini slots mapped in all the MAPs generated for a given upstream channels since last enablement of the upstream channel. One count per upstream channel may be maintained. The count may retain its value when an upstream channel is disabled (a.k.a., shutdown) and may be reset to 0 upon enablement (a.k.a., no-shutdown) of the channel.

SMTS 530 may track data mini slots mapped. This may be a running total of the mini slots mapped to short or long data grants in all the MAPs generated for a given upstream channel since last enablement of the upstream channel. One count per upstream channel may be maintained. The count may retain its value when an upstream channel is disabled and may be reset to 0 upon enablement of the channel.

SMTS 530 may track virtual bandwidth request (VBWR) data mini slots mapped. This may be a running total of the mini slots mapped to short or long data grants in all the MAPs generated for a given upstream channel in response to VBWR requests for that channel since last enablement of the upstream channel. One count per upstream channel may be maintained. The count may retain its value when an upstream channel is disabled and may be reset to 0 upon enablement of the channel.

SMTS 530 may track VBWRs received. This may be a count of the total number of VBWRs received by SMTS 530 since system startup. Only one system-wide count may be maintained. The count may be reset to 0 upon system startup.

A failover of the centralized Control/Management blade within the SMTS 530 chassis from a primary/active to standby instance and vice-versa may be considered system startup. However, it is desirable that system-global objects retain their value across such failovers.

SMTS 530 may track VBWRs unmapped. This may be a count of the total number of VBWRs discarded by SMTS 530 since system startup because an EPID could not be mapped to an active SID. Only one system-wide count may be maintained. The count may be reset to 0 upon system startup.

SMTS 530 may track VBWRs expired. This may be a count of the total number of VBWRs discarded by SMTS 530 since system startup because they could not be served within the time to live period specified by the VBWR. Only one system-wide count may be maintained. The count may be reset to 0 upon system startup.

SMTS 530 may track VBWRs discarded. This may be a count of the total number of VBWRs discarded by SMTS 530 since system startup because of other reasons. Only one system-wide count may be maintained. The count may be reset to 0 upon system startup.

SMTS 530 may track VBWR octets received. This may be a count the total number of octets that were requested for allocation by VBWRs received by SMTS 530 since system startup. Only one system-wide count may be maintained. The count may be reset to 0 upon system startup.

SMTS 530 may track VBWR octets unmapped. This may be a count of the total number of octets that were requested for allocation by VBWRs that were discarded by SMTS 530 since system startup because EPID could not be mapped to an active SID. Only one system-wide count may be maintained. The count may be reset to 0 upon system startup.

SMTS 530 may track VBWR octets expired. This may be a count of the total the total number of octets that were requested for allocation by VBWRs discarded by SMTS 530 since system startup because they could not be served within the time to live period specified by the VBWR. Only one system-wide count may be maintained. The count may be reset to 0 upon system startup.

SMTS 530 may track VBWR octets discarded. This may be a count of the total number of octets that were requested for allocation by VBWRs that were discarded by SMTS 530 since system startup because of other reasons. Only one system-wide count may be maintained. The count may be reset to 0 upon system startup. Other useful information related to bandwidth allocation by SMTS 530 and VBWRs in particular may be tracked. Each of the aforementioned counts may be reset to zero either via a command line interface or SNMP interface.

The methods, systems, networks, devices, modems, and agents described above may be implemented with or executed by one or more computer systems. The methods described above may also be stored on a computer readable medium. Many of the elements of communication system 100, communication system 300, and communication system 500 may be, comprise, or include computers systems. This includes, but is not limited to communication system 100, devices 110-113, network 120, termination system 130, shared medium 140, policy agent 150, scheduler 135, bandwidth allocation manager 136, communication system 300, modems 310-313, network 320, modem termination system 330, shared medium 340, policy agent 350, scheduler 335, request processor 336, request processor 337, communication system 500, satellite modems 510-513, network 520, satellite modem termination system 530, satellite link 540, policy agent 550, TDMA map generator 535, scheduler 560, queue 561, queue 562, queue 563, and queue 564.

Figure 7:
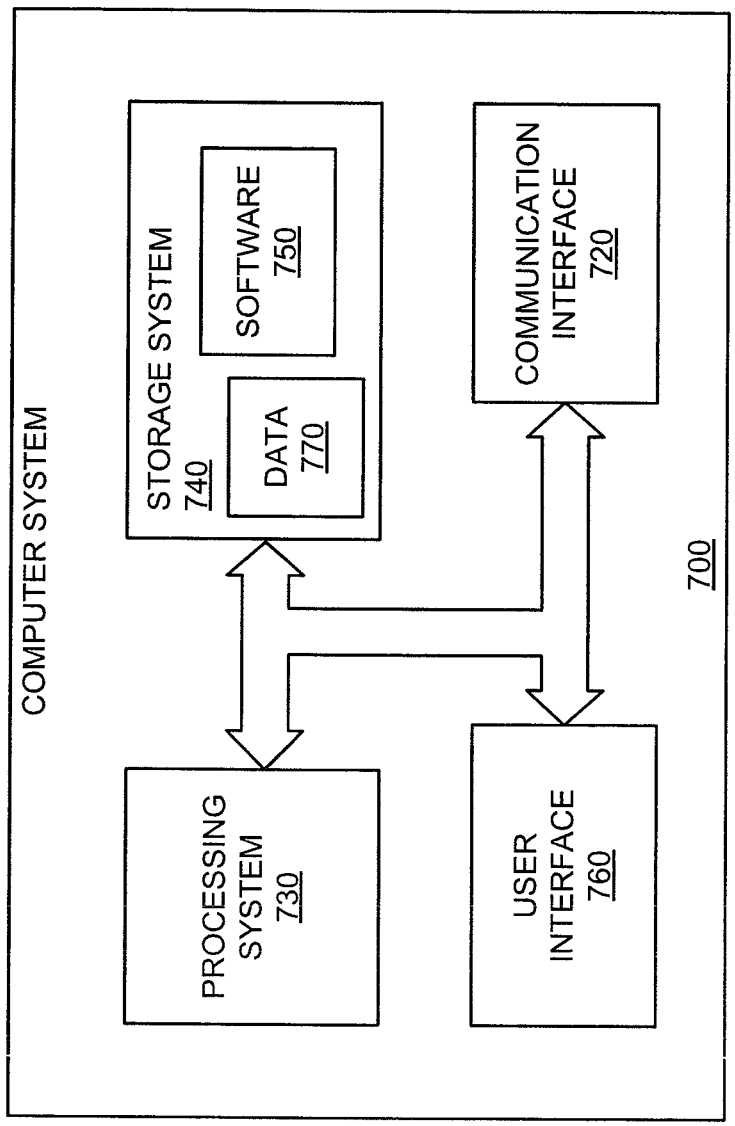
FIG. 7 is a block diagram illustrating a computer system.

FIG. 7 illustrates a block diagram of a computer system. Computer system 700 includes communication interface 720, processing system 730, storage system 740, and user interface 760. Processing system 730 is operatively coupled to storage system 740. Storage system 740 stores software 750 and data 770. Processing system 730 is operatively coupled to communication interface 720 and user interface 760. Computer system 700 may comprise a programmed general-purpose computer. Computer system 700 may include a microprocessor. Computer system 700 may comprise programmable or special purpose circuitry. Computer system 700 may be distributed among multiple devices, processors, storage, and/or interfaces that together comprise elements 720-770.

Communication interface 720 may comprise a network interface, modem, port, bus, link, transceiver, or other communication device. Communication interface 720 may be distributed among multiple communication devices. Processing system 730 may comprise a microprocessor, microcontroller, logic circuit, or other processing device. Processing system 730 may be distributed among multiple processing devices. User interface 760 may comprise a keyboard, mouse, voice recognition interface, microphone and speakers, graphical display, touch screen, or other type of user interface device. User interface 760 may be distributed among multiple interface devices. Storage system 740 may comprise a disk, tape, integrated circuit, RAM, ROM, network storage, server, or other memory function. Storage system 740 may be a computer readable medium. Storage system 740 may be distributed among multiple memory devices.

Processing system 730 retrieves and executes software 750 from storage system 740. Processing system may retrieve and store data 770. Processing system may also retrieve and store data via communication interface 720. Processing system 750 may create or modify software 750 or data 770 to achieve a tangible result. Processing system may control communication interface 720 or user interface 770 to achieve a tangible result. Processing system may retrieve and execute remotely stored software via communication interface 720.

Software 750 and remotely stored software may comprise an operating system, utilities, drivers, networking software, and other software typically executed by a computer system. Software 750 may comprise an application program, applet, firmware, or other form of machine-readable processing instructions typically executed by a computer system. When executed by processing system 730, software 750 or remotely stored software may direct computer system 700 to operate as described herein.

In an embodiment, a method of scheduling bandwidth, comprises: receiving a first bandwidth request associated with a first communication device; receiving, from a policy agent, a second bandwidth request associated with a second communication device, the second bandwidth request not originating from the second communication device; granting bandwidth to the first communication device based on the first bandwidth request; and, granting bandwidth to the second communication device based on the second bandwidth request.

The granting bandwidth to the first communication device may be further based on the second bandwidth request. The granting bandwidth to the second communication device may be further based on the first bandwidth request. The method of scheduling bandwidth may further comprise determining an association between the second communication device and a channel identifier. The method of scheduling bandwidth may further comprise determining a first association between the second communication device and a service identifier. The method of scheduling bandwidth may further comprise determining a second association between the service identifier and a quality of service classification.

An indicator of the first bandwidth request may be placed in a first scheduling queue and an indicator of the second bandwidth request may be placed in a second scheduling queue. An indicator of the first bandwidth request and an indicator of the second bandwidth request may be placed in a scheduling queue. The method of scheduling bandwidth may further comprise comparing a first indicator associated with the first communication device with a second indicator associated with the second communication device.

In an embodiment, a system for granting bandwidth requests to a shared medium, may comprise: a first request processor that receives indicators of bandwidth requests from a plurality of communication devices communicating via the shared medium; a second request processor that receives indicators of virtual bandwidth requests from a policy agent; and, a scheduler that allocates a communication resource on the shared medium based on the indicators of bandwidth requests and the indicators of virtual bandwidth requests.

A first indicator of a bandwidth request from a device may be compared with a second indicator of a virtual bandwidth request. Based on a result of the comparison and a time to live, the virtual bandwidth request may be cancelled. Based on a result of the comparison and a time to live, the virtual bandwidth request may be partially granted. A one of the indicators of bandwidth requests may placed in a first queue and a one of the indicators of virtual bandwidth requests may be placed in a second queue; and, the scheduler may allocate the communication resource by selecting the first queue to supply a first indicator and by selecting the second queue to supply a second indicator.

A one of the indicators of bandwidth requests may be placed in a queue and a one of the indicators of virtual bandwidth requests may be placed in the queue; and, the scheduler may allocate the communication resource by selecting the queue to supply the one of the indicators of bandwidth requests and the one of the indicators of virtual bandwidth requests in an order corresponding to a length of time the one of the indicators of bandwidth requests and the one of the indicators of virtual bandwidth requests have spent in the queue.

The virtual bandwidth requests may be based on information from a network protocol layer that is higher than the medium access control layer. The second request processor may determine an association between a first one of the plurality of communication devices and a first one of the virtual bandwidth requests. The association may be based on a device identifier. The second request processor may determine an association between a first one of the indicators of bandwidth requests and a first one of the virtual bandwidth requests. The determination may be based on a service identification associated with a first one of the plurality of communication devices.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of scheduling bandwidth, comprising:
   receiving a first bandwidth request associated with and originating from a first communication modem;
   receiving a second bandwidth request associated with and originating from a second communication modem;
   receiving, from a policy agent, a third bandwidth request associated with said second communication modem, said third bandwidth request not originating from said second communication modem, said third bandwidth request comprising an amount of bandwidth in excess of an amount requested from said second communication modem in said second bandwidth request;
   granting bandwidth to said first communication modem based on said first bandwidth request; and,
   granting bandwidth to said second communication modem based on said third bandwidth request instead of said second bandwidth request in response to a bandwidth request priority determination, the granted bandwidth comprising an amount equal to the amount requested from said policy agent in said third bandwidth request.

2. The method of claim 1, wherein said granting bandwidth to said first communication modem is in an amount substantially equal to an amount requested in said first bandwidth request.

3. The method of claim 1, further comprising:
   assigning a first priority to bandwidth requests originating from a communication modem receiving a grant; and
   assigning a second priority, different from said first priority, to bandwidth requests originating from the policy agent,
   wherein said granting bandwidth to said second communication modem is further based on said assigned priority associated with said third bandwidth request.

4. The method of claim 1, further comprising:
   determining an association between said second communication modem and a channel identifier.

5. The method of claim 1, further comprising:
   determining a first association between said second communication modem and a service identifier.

6. The method of claim 5, further comprising:
   determining a second association between said service identifier and a quality of service classification.

7. The method of claim 1, wherein an indicator of said first bandwidth request and an indicator of said second bandwidth request are placed in a first scheduling queue and an indicator of said third bandwidth request is placed in a second scheduling queue, different from said first scheduling queue.

8. The method of claim 1, wherein an indicator of said first bandwidth request, an indicator of said second bandwidth request, and an indicator of said third bandwidth request are placed in a same scheduling queue.

9. The method of claim 1, further comprising:
   comparing a first indicator associated with said first communication modem with a second indicator associated with said second communication modem.

10. A system for granting bandwidth requests to a shared medium, comprising:
    a first request processor that receives indicators of bandwidth requests from a plurality of communication modems communicating via said shared medium;

a second request processor that receives indicators of virtual bandwidth request from policy agent, said virtual bandwidth request comprising virtual bandwidth request amounts; and, a scheduler that allocates a communication resource on said shared medium to a first communication modem based on one or more of said indicators of virtual bandwidth request associated with said first communication modem received via said second request processor instead of one or more indicators of bandwidth request associated with said firs communication modem received via said first request processor in response to a bandwidth request priority determination, said communication resource allocated to said first communication modem in an amount of bandwidth equal to a virtual bandwidth request amount of said one or more of said indicators of virtual bandwidth requests, said one or more of said indicators of virtual bandwidth request not originating from said first communication modem, said allocated amount of bandwidth in excess of an amount of bandwidth requested from said first communication modem via said first request processor.

11. The system of claim 10, wherein a first indicator of a bandwidth request from said first communication modem is compared with a second indicator of a virtual bandwidth request.

12. The system of claim 11, wherein, based on a result of said comparison and a time to live, said virtual bandwidth request is partially granted.

13. The system of claim 10, wherein a one of said indicators of bandwidth requests is placed in a first queue and a one of said indicators of virtual bandwidth requests is placed in a second queue; and, said scheduler allocates said communication resource by selecting said first queue to supply a first indicator and by selecting said second queue to supply a second indicator.

14. The system of claim 10, wherein a one of said indicators of bandwidth request is placed in a queue and a one of said indicators of virtual bandwidth request is placed in said queue; and, said scheduler allocated said communication resource by selecting said queue to supply said one of said indicators of bandwidth request and said one of said indicators of virtual bandwidth requests in an order corresponding to a length of time said one of said indicators of bandwidth request and said one of said indicators of virtual bandwidth requests have spend in said queue.

15. The system of claim 10, wherein said virtual bandwidth request are based on information from a network protocol layer that is higher than a medium access control layer.

16. The system of claim 10, wherein said second request processor determines an association between a first one of said plurality of communication modems and a first one of said virtual bandwidth requests.

17. The system of claim 16, wherein said association is based on a device identifier.

18. The system of claim 10, wherein said second request processor determines an association between a first one of said indicators of bandwidth requests and a first one of said virtual bandwidth requests.

19. The system of claim 18, wherein said determination is based on a service identification associated with a first one of said plurality of communication modems.

20. A system of scheduling bandwidth, comprising:
means for receiving a first bandwidth request associated with and originating from a communication modem;
means for receiving, from a policy agent, a second bandwidth request associated with said communication modem, said second bandwidth request not originating from said communication modem, said second bandwidth request comprising an amount of bandwidth in excess of an amount requested from said communication modem in said first bandwidth request;
means for granting bandwidth to said communication modem based on said second bandwidth request instead of said first bandwidth request in response to a bandwidth request priority determination, the granted bandwidth comprising an amount equal to the amount requested from said policy agent in said second bandwidth request.

* * * * *

UNITED STATES PATENT AND TRADEMARK OFFICE
CERTIFICATE OF CORRECTION

PATENT NO. : 8,660,142 B2  
APPLICATION NO. : 12/552165  
DATED : February 25, 2014  
INVENTOR(S) : Aakash Sahai Page 1 of 1

It is certified that error appears in the above-identified patent and that said Letters Patent is hereby corrected as shown below:

In the Claims

In claim 10, column 15, line 2, delete "request" and insert --requests--;  
In claim 10, column 15, line 2, delete "from policy" and insert --from a policy--;  
In claim 10, column 15, line 3, delete "request" and insert --requests--;  
In claim 10, column 15, line 8, delete "request" and insert --requests--;  
In claim 10, column 15, line 10, delete "request" and insert --requests--;  
In claim 10, column 15, line 11, delete "firs" and insert --first--;  
In claim 10, column 15, line 18, delete "request" and insert --requests--;  
In claim 14, column 15, line 39, delete "request" and insert --requests--;  
In claim 14, column 15, line 40, delete "request" and insert --requests--;  
In claim 14, column 16, line 1, delete "allocated" and insert --allocates--;  
In claim 14, column 16, line 3, delete "request" and insert --requests--;  
In claim 14, column 16, line 6, delete "request" and insert --requests--;  
In claim 14, column 16, line 7, delete "spend" and insert --spent--;  
In claim 15, column 16, line 9, delete "request" and insert --requests--.

Signed and Sealed this  
Twenty-sixth Day of August, 2014

Michelle K. Lee  
*Deputy Director of the United States Patent and Trademark Office*